Jan. 23, 1973
D. A. CAMPBELL ET AL  3,712,850
METHOD FOR DETERMINING REACTOR COOLANT SYSTEM LEAKAGE
Filed Aug. 8, 1969
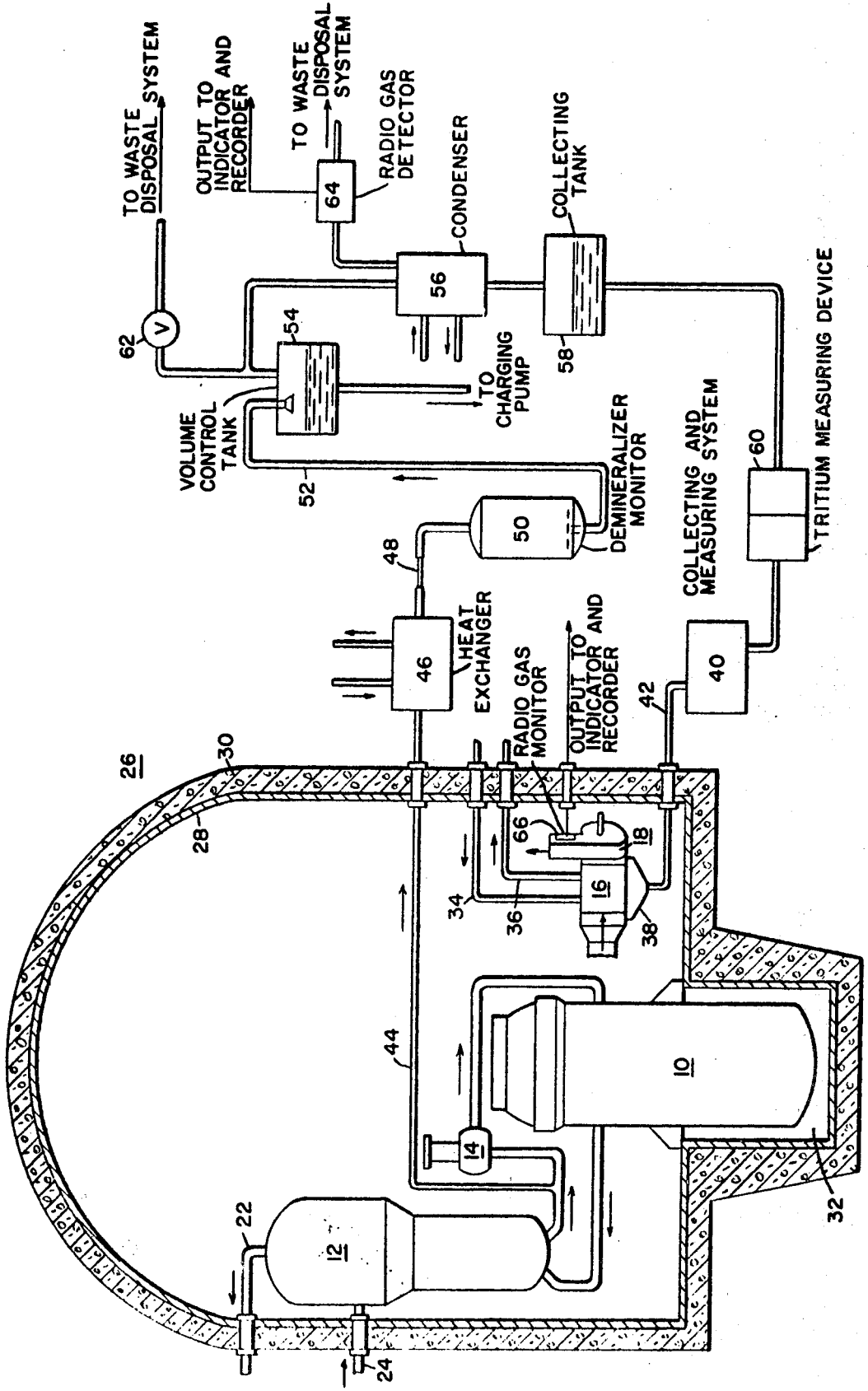

United States Patent Office

3,712,850
Patented Jan. 23, 1973

3,712,850
METHOD FOR DETERMINING REACTOR COOLANT SYSTEM LEAKAGE
Donald A. Campbell and John Locante, Monroeville, Pa., assignors to Westinghouse Electric Corporation, Pittsburgh, Pa.
Filed Aug. 8, 1969, Ser. No. 848,675
Int. Cl. G21c 17/02
U.S. Cl. 176—19 R    11 Claims

ABSTRACT OF THE DISCLOSURE

The invention provides indirect and direct methods for determining leakage from a reactor coolant system inside the reactor containment. The indirect method relies on the comparison of quantitative measurements of a tracer, such as tritium, in the reactor coolant to the tracer in the condensate collected by the containment cooling coils to determine what part of the total collection, representing all leakage, is derived from the reactor coolant system. The direct method relies on measurements of radioactivity produced by short half-lived noble gas isotopes. Measurements at a volume control tank, which is part of the reactor coolant system, and in the containment atmosphere provide sufficient information to directly reduce the reactor coolant system leakage rate.

BACKGROUND OF THE INVENTION

This invention relates, generally, to nuclear reactor power systems and, more particularly, to methods for determining leakage from a reactor coolant system within the reactor containment.

A system for measuring all leakage from water and steam systems within a reactor containment is described in a copending application, Ser. No. 761,638, filed Sept. 23, 1968 by D. A. Campbell, and assigned to the Westinghouse Electric Corporation. It is desirable to discriminate between reactor coolant system leakage, which is radioactive, and other leakage which is not radioactive. Otherwise, there could be occasions in the operation of a power plant which would require the plant to be shut down because total leakage within the containment has exceeded the limit for radioactive leakage even though the latter has not exceeded the technical specification limit.

Prior methods for measuring leakage within a reactor containment may be divided into two classes, those which account only for radioactive leakage and those which account for total leakage. In the first category, a containment particulate air monitor provides the best prior means. Although the instrument is sensitive both to low levels of activity and to sudden changes in activity, the inability to correlate instrument readings and quantitative values of leakage results in a large area of uncertainty. This uncertainty arises because deposition of the particulates occurs in many places and is a variable, subject to conditions such as the type and location of the leak.

A second method in the first category utilizes readings from a containment radiogas monitor. This instrument is much less sensitive than the particulate air monitor. Since the method relies on gases which escape through the fuel cladding defects, it has the inherent disadvantage that it is not useful unless such leakage exists. Also, the combination of fuel cladding defect and reactor coolant leakage must be great enough to cause an indication on a rather insensitive instrument. There are some leaks that this method does not detect. Thus, it is not an entirely satisfactory backup method to other methods employed.

The third method in this category requires the careful inventory of all reactor coolant system quantities and flows. To overcome the inherent disadvantage of subtracting one large quantity from another to find a small difference, accuracy in this method can only be gained by making measurements over a long period of time.

There are two prior systems for determining the total leakage within the containment. One requires the measurement of condensate collected by the cooling coils as described in the aforesaid copending application. The other uses the readings from a humidity detector. The latter suffers from insensitivity, but is a useful backup method. The sensitivity is a function of air dew point temperature, and so is a variable which depends on the temperature of the cooling water used for the cooling coils.

Accordingly, an object of this invention is to provide a reasonably accurate system for discriminating between reactor coolant system leakage, which is radioactive, and nonradioactive leakage within a reactor containment, thereby minimizing unnecessary plant shutdowns.

Another object of the invention is to provide a means for determining tritium radioactivity levels in the containment atmosphere on a continuing basis so that suitable control can be effected to permit occasional entry of personnel.

Other objects of the invention will be explained fully hereinafter, or will be apparent to those skilled in the art.

SUMMARY OF THE INVENTION

In accordance with one embodiment of the invention, discrimination between radioactive reactor coolant system leakage and nonradioactive leakage within a reactor containinment is made by comparing quantities of a tracer, such as tritium, in the reactor coolant to the tracer concentration in condensate collected by the containment cooling coils to determine what part of the total leakage is derived from the reactor coolant system. Another method is by measurement of radioactivity produced by short half-lived noble gas isotopes in the reactor coolant and in the containment atmosphere to directly determine the reactor coolant system leak rate.

BRIEF DESCRIPTION OF THE DRAWING

For a better understanding of the nature and objects of the invention, reference may be had to the following detailed description, taken in conjunction with the accompanying drawing, in which the single figure is a diagrammatic view of a portion of a nuclear reactor power system embodying principal features of the invention.

DESCRIPTION OF PREFERRED EMBODIMENTS

Referring to the drawing, the portion of a nuclear reactor power system shown therein includes a reactor vessel 10, a steam generator 12, a motor driven pump 14 for circulating a pressurized reactor coolant between the vessel 10 and the steam generator 12, reactor containment air cooling means, such as a coil 16, and air recirculating means, such as a blower 18 driven by suitable drive means, such as a motor (not shown). The foregoing apparatus is of the usual type provided at a nuclear power plant of the pressurized-water reactor type. Additional components similar to those shown may be included in the power system. The nuclear plant functions to produce steam which is conducted to a turbine generator unit (not shown) through a pipe 22. The condensed vapor is returned to the steam generator 12 through a pipe 24.

The foregoing apparatus is enclosed in a containment 26 of suitable structure, for example, a metal liner 28 disposed inside a biological shield 30 composed of reinforced concrete.

As explained in the aforesaid copending application, provision is made for determining the leakage coming from the pressurized steam and water systems within the containment 26. This is accomplished by collecting and measuring the condensate occurring at the cooling means or coil 16. This condensate will equal the leakage once the equilibrium condition is established because of the leak tightness of the containment, the absence of exposed water and other factors. The exception occurs only when a leak is so large that the liquid portion cannot evaporate at the rate at which it is being released, therefore accumulation of water occurs at the containment sump 32.

The requirement for water leaks to be evaporated involves evaporation rates and assurance of evaporation. These factors are dependent on temperature and humidity of containment air, the nature of the leakage water flow channel to the containment sump, the air movement over the leakage water, and the quantity and temperature of water leakage in any one location. Normally, conditions are favorable for the evaporation of the leakage water and the circulation thereof by the circulating means 18 as vapor mixed with air within the containment. For instance, the containment air is generally at about 120° F. and the dew point is at the cooling water temperature, resulting in low humidity. Cooling water is circulated through cooling coil 16 from an outside source (not shown) through pipes 34 and 36.

The condensate from cooling coil 16 is collected in a drip pan 38, mounted beneath the cooling coil 16, and is carried to a suitable collecting and measuring device 40 through a pipe 42. In the present instance, the measuring device 40 is shown outside the containment 26. If desired, suitable measuring devices may be located inside the containment.

The aforesaid system determines the total leakage within the containment 26. The present invention provides a system for determining what portion of the total leakage within the containment is from the reactor coolant system and is, therefore, radioactive. As explained hereinbefore, it is desirable to discriminate between radioactive leakage and nonradioactive leakage in order to prevent unnecessary shutdowns of a power plant.

One method of determining the portion of the total leakage which is radioactive depends on the utilization of a tracer having such properties that it can undergo physical transitions without significant change in tracer content. The transitions are from liquid to vapor at or near the leakage source and from vapor back to liquid at the cooling coils for the containment. If the leakage from other sources does not contain the same tracer, then a comparison of the incidence of the tracer in the reactor coolant with its incidence in the collected condensate provides the means to determine the percentage of the total leakage that has originated from the reactor coolant system. This determination may be called an indirect method because it relies on a total leakage determination obtained by other means.

A tracer meeting the foregoing requirements is tritium. Fortuitously, it is always present in the reactor coolant after moderate periods of reactor operation. It is assumed that all of the reactor coolant leaking from the reactor coolant system into the containment evaporates and carries with it to the vapor state the tritium (as $T_2O$) in exactly the same proportion as it exists in the coolant. The complete evaporation is due to the relatively small leak rates that are of concern, the low relative humidity in the containment air and the high ambient temperature.

At the cooling coils, the vapor in the containment air is extracted. Since the source of the vapor is leaks from the reactor coolant system and other water and steam sources within the containment, the comparison of tritium levels between samples from the reactor coolant system and from the cooling coil condensate provides a basis for determining the portion of leakage emanating from the reactor coolant system.

The success of this method requires that an accurate determination be made of tritium in the reactor coolant and, at approximately the same time, of tritium in the condensate collected from the containment air recirculation system. Because of the presence of other radioactive ingredients in the reactor coolant, the direct measurement of tritium in a sample coolant is difficult due to the need to discriminate from other radioactivity. It is insufficient to clean the liquid coolant by demineralization.

In power plants of the present type, it is customary to provide a bypass for the reactor coolant system through which a portion of the reactor coolant is circulated in order to remove undesirable minerals from the reactor coolant. As shown in the drawing, the bypass system includes a pipe 44 for conducting a portion of the reactor coolant from the main circulating system through a heat exchanger 46, a restriction 48 to reduce the pressure, a demineralizer 50, and a pipe 52 which discharges into a volume control tank 54. Liquid coolant is returned to the primary coolant system by means of a charging pump (not shown).

In order to obtain an accurate tritium measurement, a sample of reactor coolant found as vapor in a gaseous section of the volume control tank 54 is utilized. This sample, which is largely decontaminated from all radioactive ingredients except the tritium and noble gases, is condensed to water by means of a condenser 56. The condensate is collected in a tank 58 from which it is conducted to a tritium measuring device 60 which is also utilized to measure the tritium in the condensate collected in the measuring device 40. Tritium moves through the physical state changes intact because it is chemically combined as part of the water. Provided that a valve 62 is closed in the vent line from the tank 54 to the waste disposal system, equilibrium is reached in the vapor contained in the gas space of the tank 54 so that the tritium level is essentially in the proportion found in the coolant. The condenser 56 converts the vapor to liquid and separates it from the hydrogen gas, and contained small amounts of radioactive noble gases.

One method of measuring tritium in a sample of water is to add a phosphor, freeze the sample and measure the activity with a scintillation counter. Other known methods of measuring tritium may be utilized with the present invention.

A more direct method of determining the leakage that is from the reactor coolant system relies on determination of noble gas activity in the reactor coolant system, measurement of noble gas activity in the containment air and appropriate calculations. By keeping a continuing record of the activity level in both the coolant and the containment atmosphere as a function of time, it is possible to directly determine the leakage rate of reactor coolant which is the source of activity level in the containment air.

As this method employs readings from the radiogas monitor, it has the limitations previously discussed. The principal noble gases producing measurable activity are fuel fission products. Although some activity comes from unenclosed fuel after introduction of new fuel to the plant core, primarily, these gases result from clad leakage. This method of measurement is not effective if the combination of fuel cladding integrity and the leakage of reactor coolant is such that activity levels in the containment air are below scale on the radiogas monitor.

The most suitable gases to use as tracers in the determination of leakage are those with short half lives, for example, Kr–87 and Kr–88. These are suitable because they produce easily recognizable hard gamma radiation and reach equilibrium levels in the volume control tank a relatively short period of time after reactors startup, approximately 4 to 5 hours. Equilibrium of these isotopes is also reached in the containment atmosphere at some point in time following equilibrium in the volume control tank.

As shown in the drawing, a radiogas detector 64 is provided in the vent line from the condenser 56. A radiogas monitor 66 is provided in the containment air circulating means 18. The output information from these devices is used with a specially designed nomograph for directly determining the reactor coolant system leak rate from the equilibrium levels of these gases in the volume control tank and the containment atmosphere. The relationship directly indicates the leak rate since the containment volume is fixed and the purge system would not be in operation.

Heretofore, a sudden appearance of a rate of change of activity level in the containment atmosphere has always been a cause for concern and usually was the first indication of a change of leak rate from the reactor coolant system. The nomograph previously mentioned, can have additional scales to provide a means to rapidly determine the size of such new leak rates when they occur, without waiting for equilibrium. The variables from which the leak rate is determined are the original containment air activity level, the elapsed time period since the change started, and the activity level at the end of the elapsed time period chosen. The prior equipment for the containment air radiation monitoring system includes radiogas monitors such as the monitor 66. Therefore, the additional equipment for the direct method herein described is the instrumentation required to measure the activity of the noble gases in the volume control tank vapor space. As shown, this measurement may be made on the vent line from the condenser 56 required for the indirect method of determining the leakage from the reactor coolant system.

From the foregoing description, it is apparent that the invention provides means for discriminating radioactive, that is reactor coolant system, leakage from nonradioactive leakage within the containment of a nuclear reactor power system. The invention also provides a means for determining tritium radioactivity level in the containment atmosphere on a continuing basis so that suitable control can be effected to permit occasional entry of personnel. Only a relatively small amount of additional apparatus is required to put the invention into practice.

Since numerous changes may be made in the above described construction and different embodiments of the invention may be made without departing from the spirit and scope thereof, it is intended that all subject matter contained in the foregoing description or shown in the accompanying drawing shall be interpreted as illustrative and not in a limiting sense.

We claim as our invention:

1. In a nuclear reactor power system, in combination, a reactor vessel, vapor generating means, a circulating system for circulating a pressurized liquid coolant between the vessel and the generating means, a containment enclosing the vessel and associated components, at least one cooling device, means for circulating the atmosphere within the containment and through the cooling device to condense vapor transported with the atmosphere, means for collecting the condensate, means for measuring the quantity of the condensate to determine the total leakage within the containment, a bypass system for the coolant circulating system, and means for comparing the activity levels of a radioactive tracer in the containment atmosphere and in the coolant bypass system to determine what part of the total leakage is derived from the reactor coolant system.

2. The combination defined in claim 1, wherein the comparing means includes means for measuring the tracer in the condensate and in the coolant bypass system.

3. The combination defined in claim 1, wherein the coolant bypass system includes a closed tank containing reactor coolant and vapor containing a radioactive tracer, and the comparing means includes means for determining the activity levels of the tracer in the containment atmosphere and in the vapor in said closed tank.

4. The combination defined in claim 3, wherein the activity determining means includes radiogas monitoring means in the containment atmosphere.

5. The combination defined in claim 1, wherein the coolant bypass system includes a closed tank containing reactor coolant liquid and vapor containing a radioactive tracer, and the comparing means include a condenser for condensing said vapor, and means for measuring the tracer in the condensate from said vapor and in the condensate from the containment atmosphere.

6. The method of determining leakage from a nuclear reactor liquid coolant system including a bypass system therein, said coolant and bypass system being located within a containment, comprising the steps of maintaining the interior atmosphere of the containment at a temperature and humidity causing the leakage to evaporate, measuring the activity level of a predetermined tracer in the containment atmosphere, measuring the activity level in the bypass system of the same tracer, and comparing the activity levels of said tracer in the containment atmosphere and in the bypass system.

7. The method defined in claim 6, wherein the tracer becomes present in the coolant system after startup of the reactor.

8. The method defined in claim 7, wherein the tracer is a radioactive isotope.

9. The method defined in claim 6, wherein the tracer is a noble gas.

10. The method defined in claim 6, wherein the tracer is tritium.

11. The combination defined in claim 1, wherein the tracer has physical properties permitting it to undergo transitions from liquid to vapor and from vapor back to liquid.

References Cited

UNITED STATES PATENTS

| | | | |
|---|---|---|---|
| 2,823,179 | 2/1958 | Snell et al. | 176—19 LD |
| 2,998,519 | 8/1961 | Tunnicliffe et al. | 176—19 |
| 3,200,041 | 8/1965 | Ralfe et al. | 176—19 |

REUBEN EPSTEIN, Primary Examiner

U.S. Cl. X.R.

176—19 LD